United States Patent
Williams

(10) Patent No.: US 7,004,730 B1
(45) Date of Patent: Feb. 28, 2006

(54) INTEGRAL SHAFT FOR USE IN MUD PUMPS

(75) Inventor: Kevin R. Williams, Houston, TX (US)

(73) Assignee: Rowan Electric, Inc., Houston, TX (US)

( * ) Notice: Subject to any disclaimer, the term of this patent is extended or adjusted under 35 U.S.C. 154(b) by 101 days.

(21) Appl. No.: 10/418,637

(22) Filed: Apr. 21, 2003

(51) Int. Cl.
*F04B 17/03* (2006.01)
*F01C 3/00* (2006.01)

(52) U.S. Cl. .............. 417/362; 464/179; 464/182

(58) Field of Classification Search ........... 417/362, 417/900; 464/179, 182
See application file for complete search history.

(56) References Cited

U.S. PATENT DOCUMENTS

| | | | | |
|---|---|---|---|---|
| 2,599,575 A | * | 6/1952 | Morgan | 464/179 |
| 3,024,626 A | * | 3/1962 | Frischman | 464/179 |
| 4,228,880 A | * | 10/1980 | Gee | 192/58.61 |
| 4,524,655 A | * | 6/1985 | Waldron et al. | 82/159 |
| 4,917,573 A | * | 4/1990 | Sikula, Jr. | 416/134 R |
| 4,997,346 A | * | 3/1991 | Bohon | 417/319 |
| 5,009,205 A | * | 4/1991 | Abe et al. | 123/195 H |
| 5,724,928 A | * | 3/1998 | Morii et al. | 123/90.17 |
| 5,938,405 A | * | 8/1999 | Coleman | 416/170 R |
| 6,089,833 A | * | 7/2000 | Glanfield et al. | 417/362 |

* cited by examiner

*Primary Examiner*—Charles G. Freay
(74) *Attorney, Agent, or Firm*—Egbert Law Offices

(57) ABSTRACT

A shaft for use on in a mud pump having a shaft portion and a hub portion integrally formed with the shaft portion. The hub portion extends radially outwardly of the shaft portion. The shaft portion and the hub portion are machined from a single steel black. The hub portion has an end face with a plurality of bolt holes formed therein. The hub portion is attached to a sheave so as to receive the drive belt of a motor.

14 Claims, 5 Drawing Sheets

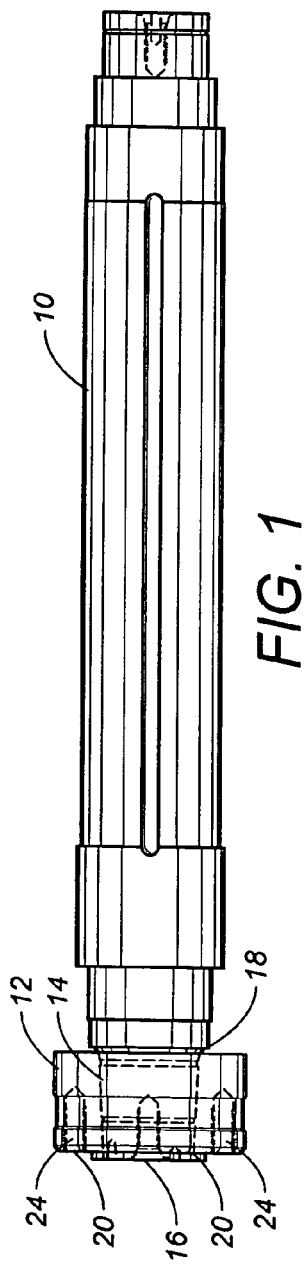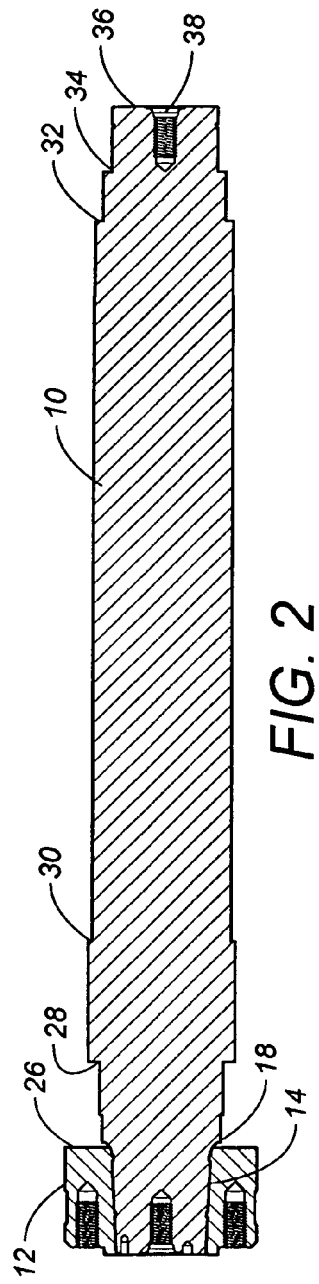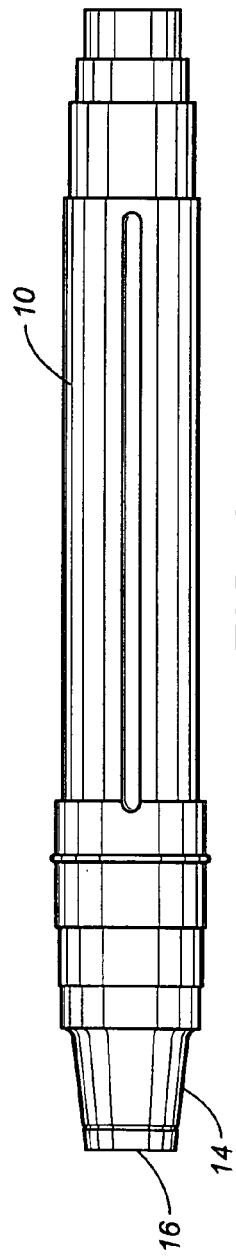
FIG. 1
Prior Art
FIG. 2
Prior Art
FIG. 3
Prior Art

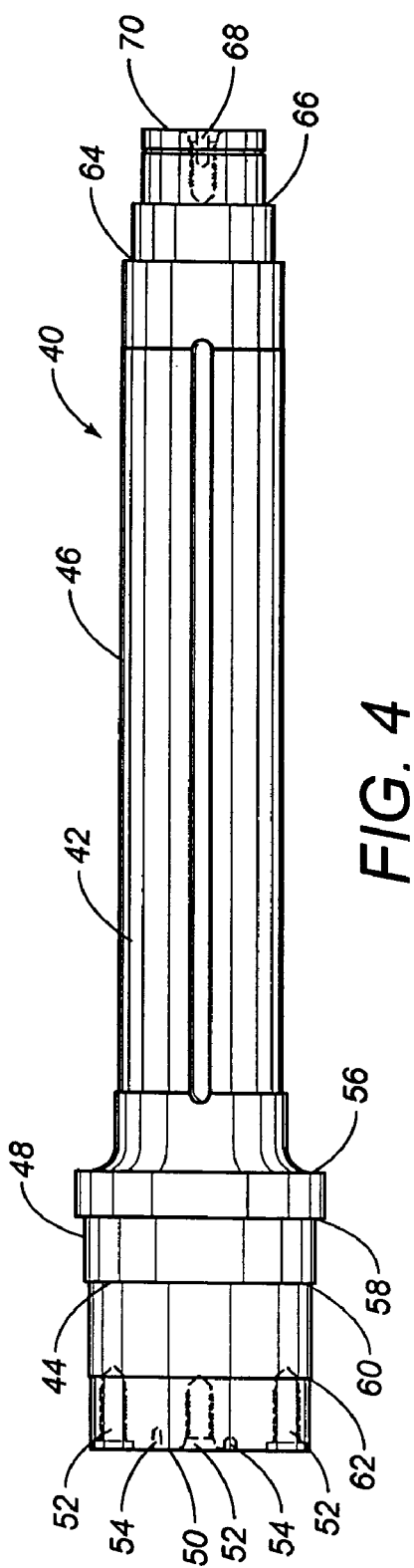
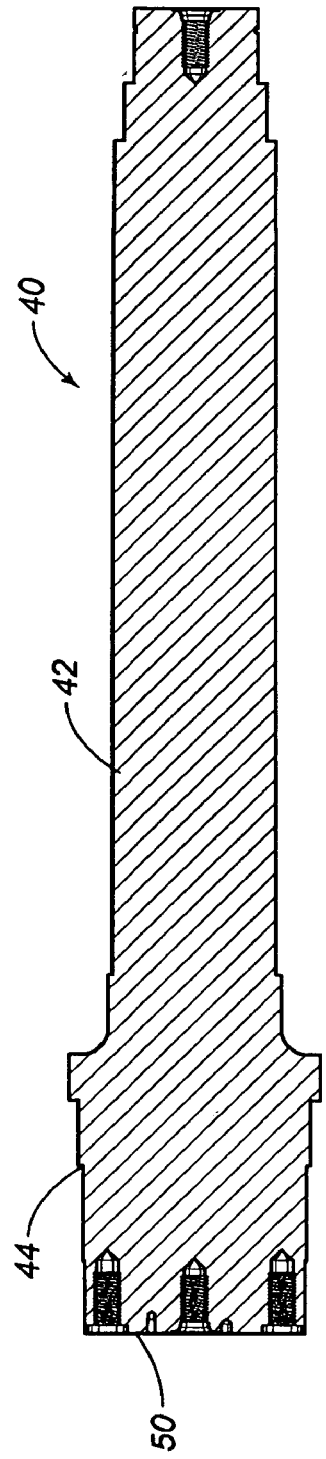
FIG. 4
FIG. 5

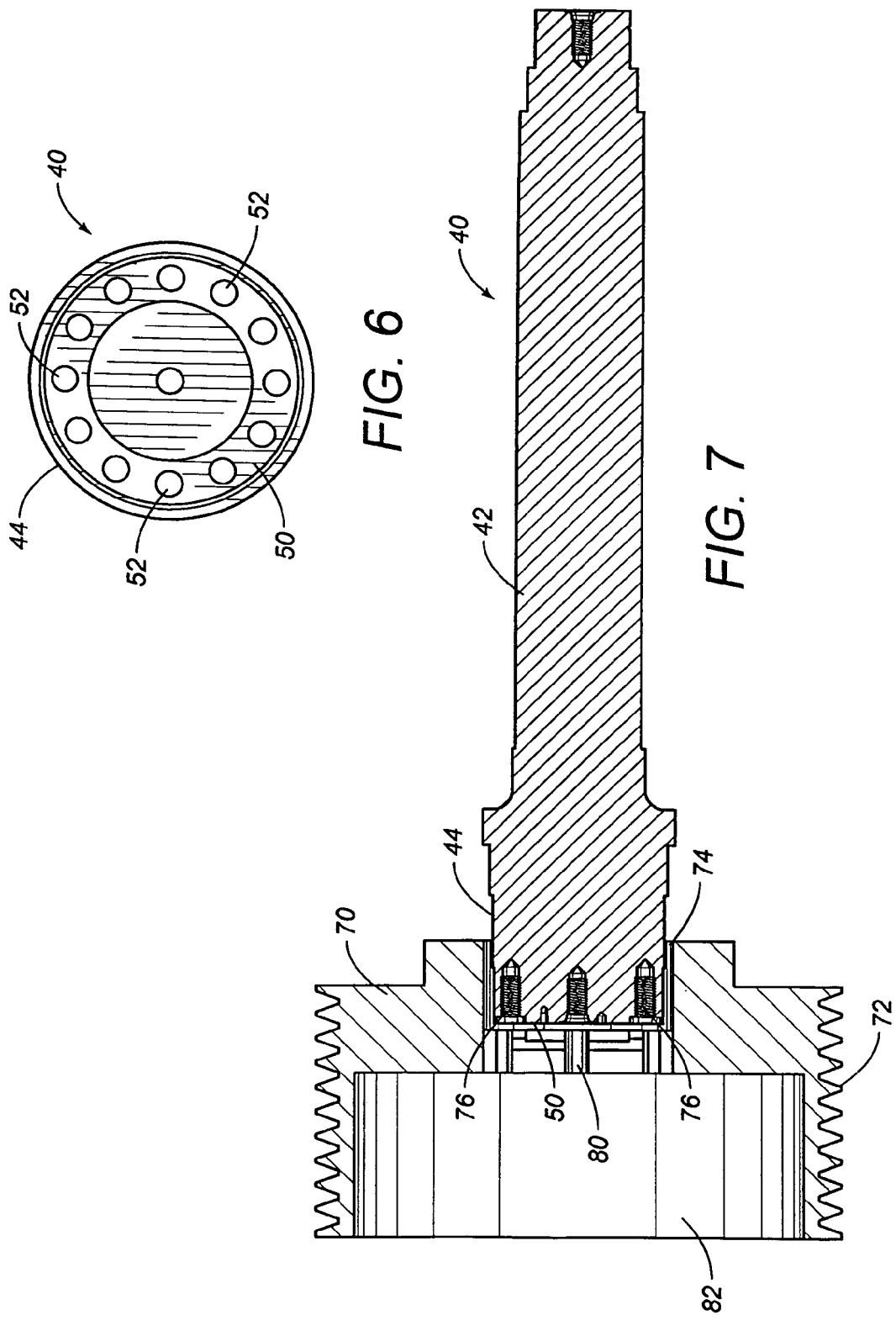

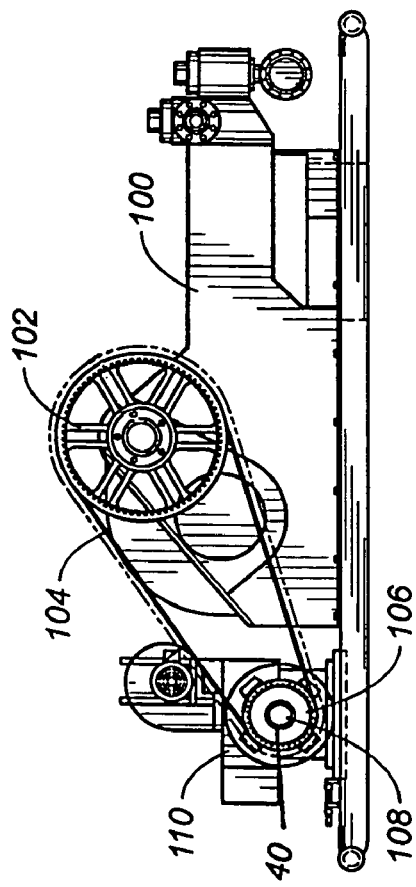
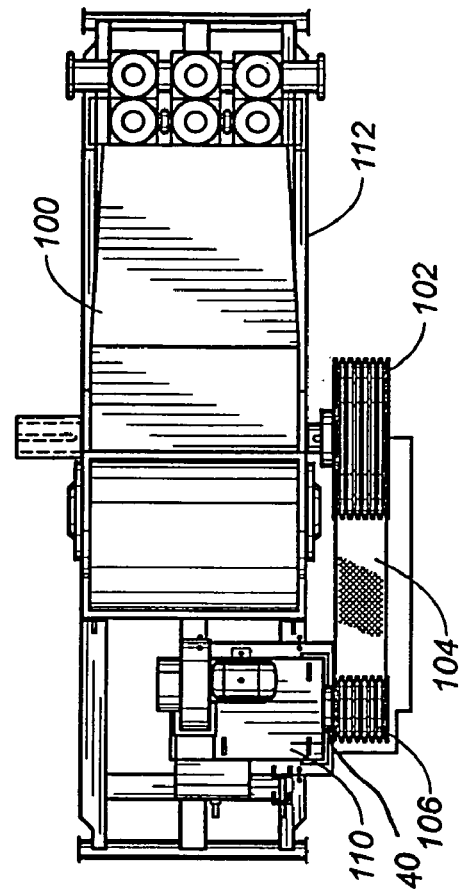

INTEGRAL SHAFT FOR USE IN MUD PUMPS

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to shafts. More particularly, the present invention relates to shafts that are used in mud pumps and other items of oil field equipment. In particular, the present invention relates to shafts having hub portions integrally formed on the end of an elongated shaft.

BACKGROUND OF THE INVENTION

In conventional offshore drilling operations from, a floating drilling vessel, a large diameter marine riser generally connects surface drilling equipment on the floating drilling vessel to a blowout preventer stack connected to a subsea wellhead located on the seabed. The marine riser is generally filled with drilling fluid (or "drilling mud") so that a total hydrostatic pressure on a formation being drilled in the wellbore is determined by the hydrostatic pressure of the mud in the drilled wellbore (below the seabed) plus the hydrostatic pressure in the marine riser (above the seabed). Conventionally, mud pumps are utilized to intensify fluid pressure for use in drilling oil wells or in conditioning oil wells, such as fracturing, with extremely high pressure or abrasive fluids. Various mud pumps and pressure intensification pumps are already known to exist that employ various means to overcome the difficulties encountered during the prolonged pumping of high volume, high pressure and abrasive materials.

In the past, these mud pumps have employed an elongated shaft in the drive system of the mud pump. The elongated shaft generally has a relatively long length with respect to the diameter of the shaft. For example, a conventional shaft for a mud pump can have an overall length of over 4 feet and a shaft diameter of approximately 5 inches. So as to allow this relatively small diameter shaft to be properly driven, a hub is mechanically connected to an end of the shaft. This hub can then be connected to a sheave so that drive belt can be extended thereover and driven by an associated motor.

In the past, the standard mud pump shaft has been manufactured by General Electric and was particularly designed for use on locomotives. This shaft was readily available from General Electric at a relatively low cost. Since the number of the drive shafts that have been manufactured for locomotives greatly exceeds the number of drive shafts used for mud pumps, this readily available and relatively inexpensive shaft was particularly adapted for use on mud pumps. The shaft became a standard item as used with mud pumps, and other pieces of oil field equipment, such that the footholds for the shaft became relatively standardized.

FIGS. 1 and 2 illustrate the conventional mud pump shaft that is presently employed in oil field equipment. In FIG. 1, the shaft 10 has a relatively elongated configuration with a hub 12 affixed at one end thereof. The hub 12 is secured to a tapered surface 14 at the end of the shaft 10. The tapered end surface 14 is tapered so as to widen in diameter from end 16 toward the shoulder 18 of shaft 10. The tapered surface 14 is specifically configured so that the hub portion 12 can be securely affixed thereto.

The hub 12 extends radially outwardly from the tapered surface 14. The hub 12 also has tapered diameter 20 which will match with the tapered outer diameter of the tapered surface 14. Conventionally, the hub 12 will be heat shrink fit onto the tapered surface 14 of shaft 10. This form of fitting can also be termed "interference fit". The hub 12 is heated so as to slightly expand. The hub 12 can be placed over the tapered surface 14 and then cooled. As a result, the hub 12 will be fixedly and securely attached to the tapered surface 14 of the shaft 10. The addition of hub 12 allows the standard locomotive shaft to be adapted for use in mud pump operations.

As can be seen in FIG. 1, the hub 12 has an end face 22 having a plurality of bolt holes 24 formed therein. The bolt holes 24 allow the hub 12 to be securely mounted within a sheave. The end 16 of the shaft 10 will be flush with the end face 22 of the hub 12.

FIG. 2 illustrates a cross-sectional view of the connection between the shaft 10 and the hub 12. In particular, FIG. 2 illustrates that the hub 12 is mechanically connected along interface 26 with the tapered surface 14 of the shaft 10. The shoulder 18 acts a limit to the positioning of the hub 12 on the end of the shaft 10. Various other shoulders 28, 30, 32 and 34 are formed along the length of the shaft 10. The shoulders 28, 30, 32, and 34 allow the shaft 10 to be placed into the standardized footholds within the mud pump. The opposite end 36 of shaft 10 has hole 38 formed therein.

Over the years, the shaft and hub configuration of FIGS. 1 and 2 has performed satisfactorily in the field. In the past, the shafts 10 have be driven by DC motors. Typically, the hub 12 would be connected to a chain or a gear driven hub. In these arrangements, there have been relatively few instances of slippage or disconnection between the hub 12 and the tapered surface 14 of the shaft 10.

In the past, mud pumps systems were commonly driven by the variable speed DC motors. However, due to increasing pump size and power requirements, AC induction motors are now used in conjunction with the mud pump systems. In fact, the various pieces of equipment that are used in offshore platforms are increasingly driven by AC power. AC power can generate 800 horsepower at 1100 rpms so as to produce an extremely high torque upon the shaft. Mud pumps have a variable power curve. The torque requirements range between 130% and 80% of nominal. Unlike DC motors, AC motors can almost instantaneously supply the power requirements of the mud pump. On oilfield equipment, these AC motors are used for mud pumps, drawworks, top drives, propulsion systems and rotary tables. Recently, following the increased use of AC motors, it has been found that the standard mud pump shaft/hub configuration shown in FIGS. 1 and 2 began to experience failures. Experimentation determined that the shaft fatigue failures appeared to be due to bending stresses and not from torsional vibrations. Extensive analysis on this failure situation revealed that the shaft failures were largely the result of the mechanical connection between the hub and the end of the shaft. Since the shaft is of relatively small diameter at its connection with the hub, the bending stress failure resulted because of the cantilever effect imparted upon the shaft by the strong connection between the hub, the attached sheave and the belt drive from the AC motor.

At present, KEVLAR (TM) belts are used to drive the mud pump. These belts are very strong. If these belts are over-tightened, they can result in a bent or stressed motor shaft. As a result, it has been critical that the proper belt tension be applied so as to limit the side-load on the motor shaft and to prevent slipping the sheave. Air cylinders have been used in the past so as to accurately tension belts within the specifications for the standard shaft (as shown in FIGS. 1–3). Additionally, shaft failure can also result from a lack of alignment of the shaft. If the motor shaft and the pump shaft are not parallel, the outer portion of the sheave can be loaded more than the inboard side. This can cause the effective moment arm to be beyond the center of sheave and increase the bending moment and stresses in the motor shaft.

FIG. 3 illustrates the standard locomotive shaft 10 as used in conjunction with mud pumps. Shaft 10 is particularly illustrated as having tapered surface 14 adjacent end 16. Tapered surface 14 will receive the shrink-fit hub thereon. In normal use, the shaft 10 would not be connected to a hub but would be joined to the drive system of a locomotive. As can be seen, the prior art shaft 10 is not configured for direct use as the shaft of a mud pump.

It is important to note that when there is a shaft failure, a great deal of consequential damage can occur. For example, repair and replacement of the shaft is required before the mud pump can continue to be used. Because of the importance of the mud pump, it is also necessary to have replacement shafts available in the event of such a failure. Many times, repair is virtually impossible since the broken connection between the hub and the shaft would greatly damage both the hub and the receiving surface of the shaft. Conventionally, the hub and the shaft would have to be replaced. Whenever repair and replacement must be carried out on an offshore oil rig, there is a great deal of down time for labor and equipment. This can be extremely expensive. As a result, it is extremely desirable to avoid any hub or shaft failure during the oil drilling operations.

It is an object of the present invention to provide a shaft for a mud pump which minimizes failure and fractures.

It is another object of the present invention to provide a shaft for a mud pump which avoids the mechanical connection between the hub and the end of the shaft.

It is an object of the present invention to provide a shaft for a mud pump which is adaptable to the existing footholds in existing mud pumps.

It is still an object of the present invention to provide a shaft for a mud pump that is easy to manufacture, easy to use and easy to install.

It is still a further object of the present invention to provide a shaft which is adaptable for use in conjunction with AC motors for other types of oilfield equipment such as drawworks, top drives, propulsion systems and rotary tables.

These and other objects and advantages of the present invention will become apparent from a reading of the attached specification and appended claims.

BRIEF SUMMARY OF THE INVENTION

The present invention is a shaft for use in a mud pump. This shaft includes a shaft portion having an outer diameter and a hub portion integrally formed with the shaft portion. The hub portion extending radially outwardly of the shaft portion has an outer diameter greater than the outer diameter of the shaft portion. The shaft portion and the hub portion are machined from a single steel blank.

In the present invention, the hub portion has an end face. This end face has plurality of bolt holes formed therein. The hub portion has a means thereon for attachment to a drive belt of a motor. In particular, this motor can be an AC motor and the drive belt can be of a polymeric material, such as KEVLAR (TM). The hub portion includes a shoulder thereon adjacent to the shaft portion. The shaft portion extends outwardly from the shoulder.

A sheave is mechanically affixed to the hub portion. The sheave has a belt-receiving surface thereon. In particular, the sheave has a central opening formed therein. The hub portion is received within the central opening and is bolted to the sheave.

The hub portion, in one embodiment of the present invention, has a plurality of sections of varying diameter formed therealong. Each of these sections has a shoulder facing an adjacent section. Alternatively, the hub portion can have a constant diameter extending from an end thereof toward the shaft portion.

The present invention is also a drive system for oil field equipment which comprises a motor having a rotor, a shaft having a hub portion and a shaft portion integrally formed together, a first sheave affixed to the rotor of the motor, a second sheave affixed to a hub portion of the shaft and a drive belt extending around the first and second sheaves. The drive system is an AC motor. The drive belt is formed of a polymeric material, such as KEVLAR (TM). The shaft is drivingly received by the footholds of a mud pump. In normal use, the first sheave will have a smaller diameter than the diameter of the second sheave. The shaft, along with its hub portion and shaft portion, has a configuration similar to that described hereinbefore.

BRIEF DESCRIPTION OF THE SEVERAL VIEWS OF THE DRAWINGS

FIG. 1 is a side elevational view of the shaft of the prior art with the hub portion transparently shown.

FIG. 2 is a cross-sectional view of the shaft and hub of the prior art.

FIG. 3 is a side elevational view of the shaft of the prior art, as isolated from the hub.

FIG. 4 is a side elevational view of the shaft of the present invention.

FIG. 5 is a cross-sectional view of the shaft of the present invention.

FIG. 6 is an end view of the shaft of the present invention.

FIG. 7 is a cross-sectional view showing the shaft of the present invention as secured to a sheave.

FIG. 9 is a side elevational view of the drive system of the present invention as applied to a mud pump.

FIG. 10 is a plan view of the drive system of the present invention as applied to a mud pump.

DETAILED DESCRIPTION OF THE INVENTION

Figure 8:
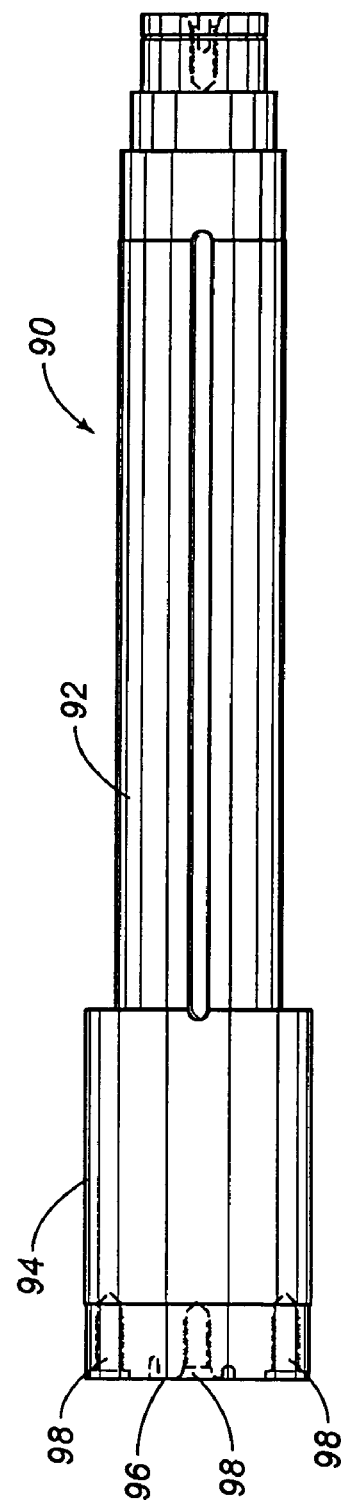
FIG. 8 is a side elevational view of an alternative embodiment of the shaft of the present invention.

FIG. 4 illustrates the shaft 40 of the preferred embodiment of the present invention. Shaft 40 is particularly configured for use with a 1150 horsepower motor. The shaft 40 includes a shaft portion 42 and hub portion 44. The shaft portion 42 is integrally formed with the hub portion 44. The shaft 40 is integrally formed from the machining of a single steel blank of 4140 steel. The shaft 40 will be solid throughout, except for the pin holes and bolt holes.

In FIG. 4, it can be seen that the shaft portion 42 has an outer diameter 46. The hub portion 44 also has an outer diameter 48. The outer diameter 48 of the hub portion 44 is greater than the outer diameter of the shaft portion 42. The hub portion 44 has an end face 50. The end face 50 has a plurality of bolt holes 52 formed therein. Bolt holes 52 are formed by standard drilling and tapping machining operations. Relief holes 54 can also be formed on end face 50. The bolt holes 52 are suitable for joining the hub portion 44 within the central opening of a sheave, to be described hereinafter.

The hub portion 44 has a shoulder 56 formed thereon adjacent to the shaft portion 42. The shaft portion 42 will extend outwardly from the shoulder 56. The hub portion 44 also has several other shoulders 58, 60 and 62 formed thereon. Shoulders 58, 60 and 62 facilitate the ability of the hub 44 to be received within the footholds of a mud pump. The arrangement of shoulders 56, 58, 60 and 62 will emulate the configuration of the hub 12 as used on the standard prior art configuration.

The shaft portion 42 also has shoulders 64 and 66 formed thereon at an end opposite the hub portion 44. Shoulders 64 and 66 are also configured so as to emulate the standard shaft of the prior art. A pin hole 68 is formed at the end face 70 of shaft 40.

FIG. 5 is a cross-sectional view of the shaft 40 of the present invention. Importantly, in FIG. 5, it can be seen that both the shaft portion 42 and the hub portion 44 are integrally formed together of a single steel material. There are no interfaces or connections between the hub portion 44 and the shaft portion 42. Since the shaft 40 is particularly adapted for use on a mud pump and is not a standard locomotive shaft, there is no need to interface a hub with the shaft. Although the machining of the shaft 40 from a single steel blank will be more expensive than the formation of the shaft of the prior art from a standard locomotive shaft and a hub, it is believed that the failure prevention resulting from the use of the shaft 40 will minimize the effects of any excess costs. Since there are no interfaces, there is less likelihood of cantilever effects would fracture the solid shaft 40. There is virtually no possibility of the hub portion 44 becoming dislocated or disconnected from the shaft portion 42. In the present invention, where the cantilever effects are the greatest, i.e. at the end 50 of the shaft 40, there is a substantially greater amount of steel material for the purpose of providing strength and integrity. As a result, the strength of the shaft is bolstered in the areas where strength is needed most. The present invention entirely eliminates the need to repair shaft components on the oil rig. The shaft 40, if required, can be replaced as a single unit.

FIG. 6 is an end view of the shaft 40. FIG. 6 shows the end face 50 of the hub portion 44. It can be seen that a plurality of bolt holes 52 are formed around the end face of the shaft. Bolt holes 52 are particularly configured so as to be joined to the respective bolts within the sheave.

FIG. 7 shows the sheave 70 as joined to the hub portion 44 of shaft 40. The sheave 70 has a belt-receiving surface 72 formed on an outside surface thereof. The sheave 70 also has a central opening 74 having an inner diameter generally matching the outer diameter of the hub portion 44 at the end face 50. A plurality of bolts 76 extend through a wall 80 of the sheave 70 so as threadedly connect with the bolt holes 52 formed in the end face 50 of the hub portion 44 of shaft 40. A central opening 82 is formed on sheave 70 so as to allow access to the bolts 76 for the purpose of securing the shaft 40 within the opening 74 of sheave 70. It is important to note that the sheave 70 can have a wide variety of other configurations. The belt-receiving surface 72 of sheave 70 is particularly adapted for receiving a KEVLAR (TM) belt. However, various other belt-receiving surfaces 72 can also be employed with sheave 70 so as to receive other types of belts and/or chains. Additionally, if a gear system is used for the driving of shaft 40, the belt-receiving surface 72 can also include suitable teeth for engaging the gear system.

FIG. 8 shows an alternative embodiment of the shaft of the present invention. Shaft 90 has a configuration very similar to that of the previous embodiment of shaft 40. However, shaft 90 has shaft portion 92 and a constant-diameter hub portion 94. It has been found that in 1500 horsepower systems, the desired footprint will be in the nature of a constant diameter hub portion 94. As such, the shaft 90 will fit the footholds of such a drive system. The hub portion 94 also includes an end face 96 with bolt holes 98 formed therein. The end face 96 will have a configuration similar to the end face 50 of the previous embodiment of the present invention. As with the previous embodiment of the present invention, both the shaft portion 92 and the hub portion 94 are machined from a single steel blank.

FIG. 4 shows the use of the shaft 40 in mud pump 100. Mud pump 100 is a standard oilfield mud pump. Shaft 40 will extend through the mud pump 100 so as to be part of the drive system for the mud pump. The shaft 40 is suitably bolted within the sheave 102 of mud pump 100. A belt 104 extends over the sheave 102 and also extends over a sheave 106. Sheave 106 is attached to the rotor 108 of motor 110. The rotation of the rotor 108 by the motor 110 will cause the sheave 106 to drivingly move the belt 104 for the rotation of sheave 102 and for the rotation of shaft 40. In FIG. 9, the motor 110 is an AC motor, preferably generating at least 800 horsepower at 1100 rpm's. The belt 104 can be formed of a polymeric material, such as KEVLAR (TM). The distance between the sheaves 102 and 106 can be varied so as to properly tighten the belt around the respective sheaves. However, the strength of the shaft 40 of the present invention avoids the need for extreme precision in the tightening of the belt 104. Additionally, the strength of the shaft 40 also avoids the extreme precision required for parallelism between the rotor 108 of motor 110 and the shaft 40 of the mud pump 100. The strength of the shaft 40 will withstand the harsh environment in which it is placed.

FIG. 10 illustrates the mud pump 100 as having the sheave 102 extending outwardly from one side 112 thereof. The belt 104 extends over sheave 102 and also over the sheave 106. Motor 110 is drivingly connected to the sheave 106 so as to impart relative movement to the belt 104. The sheave 102 is particularly illustrated as secured to the shaft 40. Shaft 40 extends transversely through the mud pump 100. It can also be seen that the sheave 102 has a greater diameter than the sheave 106.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A shaft for use on an AC motor of a mud pump comprising:
   a shaft portion having an outer diameter and an end drivingly received by the mud pump; and
   a hub portion integrally formed with said shaft portion and drivingly connected to the AC motor, said hub portion extending radially outwardly of said shaft portion and having an outer diameter greater than said outer diameter of said shaft portion, said shaft portion and said hub portion being machined from a steel blank, said hub portion having an end face having a plurality of bolt holes formed therein, said plurality of bolt holes extending for less than the length of said hub portion.

2. The shaft of claim 1, said hub portion having a means thereon for attachment to a drive belt of a motor.

3. The shaft of claim 2, said drive belt being of a polymeric material.

4. The shaft of claim 1, said hub portion having a shoulder formed thereon adjacent said shaft portion, said ft portion extending axially outwardly from said shoulder.

5. The shaft of claim 1, further comprising:
a sheave mechanically affixed to said hub portion, said sheave having a belt-receiving surface thereon.

6. The shaft of claim 5, said sheave having central opening formed therein, said hub portion being received within said central opening said hub portion being bolted to said sheave.

7. The shaft of claim 1, said hub portion having a plurality of sections of diameter formed therealong, each of said plurality of sections having a shoulder facing an adjacent section.

8. The shaft of claim 1, said hub portion having a constant diameter extending from an end thereof toward said shaft portion.

9. A drive system for an item of oil field equipment comprising:
an AC motor having a rotor, a shaft having a hub portion and a shaft portion integrally formed together from a single steel blank, said hub portion having an face with a plurality of bolt holes formed the and extending for less than a length of said hub portion, said shaft portion being drivingly received by a mud pump;

a first sheave having a central opening formed therein, said hub portion of said shaft being received within said central opening, said hub portion bolted to said first sheave;

a second sheave affixed to said rotor of said motor, and a drive belt extending around said first and second sheaves.

10. The drives system of claim 1, said drive belt being formed of a polymeric material.

11. The drive system of claim 1, said first sheave having a smaller diameter than a diameter of said second sheave.

12. The drive system of claim 9, said hub portion having a shoulder formed thereon adjacent said shaft portion, said shaft portion extending axially outwardly from said shoulder.

13. The drive system of claim 9, said hub portion having a plurality of sections of varying diameter formed therealong, each of said plurality of sections having a shoulder facing an adjacent section.

14. The drive system of claim 9, said hub portion having a constant diameter extending from an thereof toward said shaft portion.

* * * * *